3,255,596
PURIFICATION OF HYDROGEN-RICH GAS
Saverio G. Greco, Mount Pleasant, and Richard G. Graven, North Castle, N.Y., assignors to Socony Mobil Oil Company, Inc., a corporation of New York
Filed Apr. 8, 1963, Ser. No. 271,295
7 Claims. (Cl. 62—23)

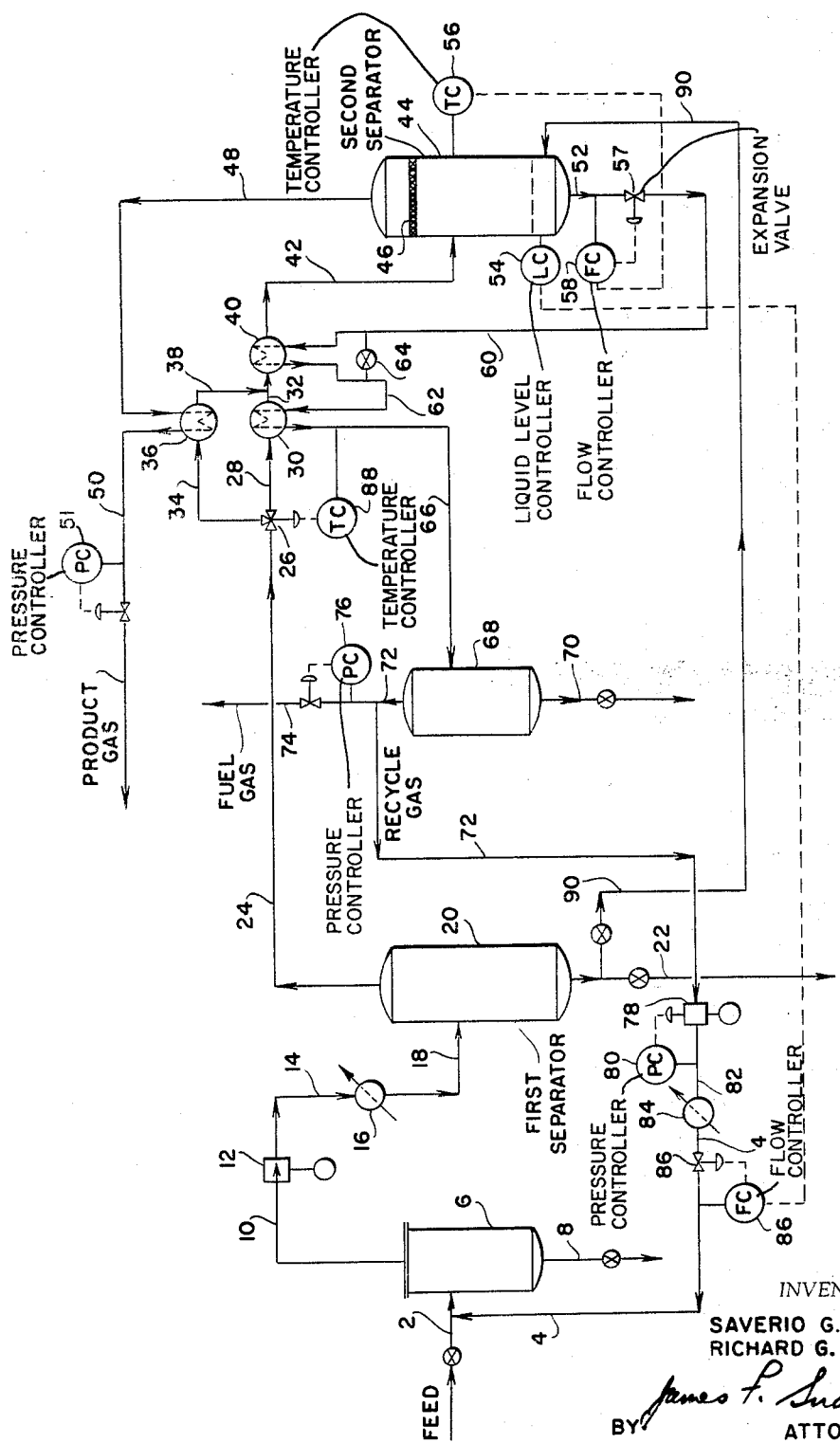

The present invention relates to a continuous process for the purification of lean gaseous mixtures containing low boiling material in major proportion and high boiling material by removal of at least a part of the high boiling material. More particularly, it is concerned with the separation normally liquid hydrocarbons from a gaseous mixture of hydrogen and a variety of hydrocarbons.

The use of hydrogen in petroleum refining and petrochemical production is continuously increasing in variety and in volume, and such operations often require hydrogen streams substantially free of certain impurities. In view of the extremely large scale operations employed in these industries, it is important to have highly efficient hydrogen purification methods.

Hydrogen purification problems may be illustrated by the preparation of a hydrogen-containing gas to be used in the production of cyclohexane by the hydrogenation of benzene. Cyclohexane has a relatively low boiling point, and it is difficult and costly to separate other compatible, normally liquid hydrocarbons with low boiling points from cyclohexane. Hydrogen of commercial purity can be charged as a reactant, but it is usually too expensive for this utilization. There are commonly a number of hydrogen-rich gaseous mixtures available around petroleum refineries, such as the off-gases of catalytic processes for reforming naphthas and of octafiners that are isomerizing xylenes. These gaseous mixtures contain varying proportions of unobjectionable normally gaseous hydrocarbons, especially methane and ethane, which have no substantial tendency to remain in the cyclohexane product as impurities; however, hydrocarbons containing 5 to 8 carbon atoms are also generally present, and these impurities are objectionable as they tend to remain in the cyclohexane, thereby reducing its purity and market value. In manufacturing cyclohexane of high purity, is desirable to have a gas rich in hydrogen which is substantially devoid of normally liquid hydrocarbons, at least to the extent that the total content of such hydrocarbons does not exceed about 0.01 mol percent of the hydrogen-rich gas.

It is not as simple a matter as it seems, to economically remove small contents of these $C_{5+}$ or normally liquid hydrocarbons from the hydrogen-containing gases. Absorption systems, wherein these heavier hydrocarbons are absorbed in a lean oil, leave much to be desired as they tend to introduce small amounts of the vapor of that oil into the gas undergoing treatment. Moreover, absorption does not significantly increase the proportion of hydrogen in the gaseous product over that in the raw feed and the absorption method is usually more expensive than low temperature purification. Systems for condensing the heavier hydrocarbons out of the gas stream by refrigeration with external refrigerants are relatively expensive and would require at least two stages of refrigeration with a consequent greater loss in refrigerating efficiency as the overall efficiency is the product of the efficiencies of the two individual stages. Another possibility is one-stage vacuum refrigeration, but this requires complex equipment with higher maintenance costs and it introduces operating difficulties and potential explosion hazards.

The process of the present invention attains the desired results without the disadvantages of the systems mentioned above. It involves a single stage internal refrigeration method using a self-generated refrigerant, hence it operates more efficiently than the refrigeration systems of the prior art and it is simpler to build thereby reducing the necessary plant investment. In contrast to the known absorption systems, it does not introduce foreign substances into the material undergoing purification and the product to substantially richer in hydrogen instead of having the hydrogen content essentially unchanged as is true of absorption methods.

An object of the invention is to provide an improved method for the removal of high boiling material from gaseous mixtures rich in one or more low boiling constituents.

Another object of the invention is to provide improved control of the separation by condensation of readily condensable material from a mixture also containing a major molar proportion of difficultly condensable material.

A further object of the invention is to provide an improved method for the separation of normally liquid hydrocarbons from mixtures of hydrogen and a variety of hydrocarbons in the vapor state.

Other objects and advantages of the invention will be apparent to those skilled in the art upon consideration of the detailed disclosure which follows.

The term "readily condensable" refers to substances which can readily be condensed under typical process conditions available in a refinery without the special precautions needed for cryogenic operations and for the present purposes these substances may be said to be those having a critical temperature above about $-80°$ F. in contrast with "difficulty condensable" ones like hydrogen and methane which have critical temperatures lower than $-80°$ F.

Unless otherwise specified herein, the term "material" is employed in its generic sense to denote a single substance or mixtures of substances.

The expressions "normally gaseous" and "normally liquid" are used in their conventional sense of referring to susbtances that are in the vapor state or the liquid state, respectively, at $70°$ F. under atmospheric pressure.

The expression "autogenous refrigeration" is employed to describe an internal refrigeration cycle wherein no extraneous fluid refrigerant is used. Instead the material undergoing treatment for purification also serves as its own internal refrigerant in being compressed and chilled until a substantial proportion of its constituents are first liquefied and then later vaporized in indirectly cooling a compressed stream of more of the same material until the readily condensable components thereof are condensed to the liquid state. The chilled but uncondensed gaseous fraction may also be utilized in an indirect heat exchanger to provide a lesser part of the refrigeration.

The expression "major" is used herein to denote proportions of more than half, that is more than 50%, of the total mols or other selected unit for a substance in mixtures, while "minor" denotes less than half. Besides referring to the proportion of an individual substance, these expressions are also used with respect to two or more selected substances, such as commingled hydrogen and methane or normally gaseous hydrocarbons, in admixture with other substances to set forth in a general statement the proportions of the sum of the mols or other quantities of these selected materials relative to the total mols, etc. of all substances contained in the mixtures.

The present invention concerns a continuous process for the purification of a lean gaseous mixture which comprises blending a rich gaseous mixture containing a substantial molar proportion of high boiling or readily condensable material with a lean gaseous mixture containing low boiling or difficultly condensable material in major molar proportion and high boiling material, liquefying a substantial part of said gaseous blend, separating the resulting liquid and gaseous fractions thereof, and indirectly cooling said gaseous blend with said liquid fraction whereby said liquid fraction is vaporized while said gaseous blend undergoes said liquefaction. An especially significant embodiment of the invention involves recycling at least a substantial portion of said vaporized liquid fraction to the blending operation as said rich gaseous mixture. It is surprising that recycling this stream facilitates not only purifying the raw material more efficiently but also enriching the product by eventual removal of the undesired readily condensable material, because the selected recycle stream contains a far lower proportion of the desired substances and considerably more of the undesirable impurities than the raw material itself. In addition, this recycle stream serves the dual purpose of acting as a refrigerant prior to being blended with the charge.

Narrower aspects of the invention relate to improved control of the liquefaction operation, removal of substances that freeze readily from the blend prior to substantial liquefaction thereof, regulation of the proportion of readily condensable materials in the recycle stream relative to the feed or charge stream and also at other stages in the process, and the application of the instant process to purifying and enriching certain mixtures of hydrogen with hydrocarbons.

While the present invention is especially concerned with the purification of hydrogen in admixture with hydrocarbons including undesired normally liquid hydrocarbons for a wide variety of purposes, such as hydrogenating of benzene to cyclohexane, it is not restricted to the purification of hydrogen or any other particular substance. It may be employed widely in separating one or more readily condensable substances from a lean gaseous mixture of difficultly condensable material in major proportion with a minor proportion of the readily condensable material. For example, natural gasoline may be recovered from natural gas by the technique of the instant process, or a stream rich in $C_{2-4}$ hydrocarbons may also be obtained from the natural gas as a charge stream for the production of olefins by pyrolysis.

For a better understanding of the nature and objects of this invention, reference should be had to the accompanying drawing which is a flow sheet or simplified schematic diagram of the present process, together with the detailed description which follows.

The composition of a typical raw feed gas rich in hydrogen and containing various hydrocarbons is listed in the first column of the table hereinafter. This charge is derived from a mixture of the off-gases from a low pressure catalytic reforming of naphtha and from an octafining operation for isomerizing xylenes. Despite its relatively high hydrogen content, this gas is unacceptable for the hydrogenation of benzene because its content of 2.4 mol percent of normally liquid hydrocarbons other than benzene would contaminate the relatively pure cyclohexane product.

Turning now to the drawing, the aforesaid feed gas is charged to the purification system in conduit 2. A recycle gas containing a mixture of hydrocarbons, predominantly $C_2$ and $C_3$ hydrocarbons, is introduced from a source described hereinafter via line 4 into the charge gas in pipe 2. The mixed gases then pass through compressor suction knock-out drum 6 where any liquid is withdrawn through valved line 8 at the bottom whenever necessary. Meanwhile, the lean feed gas together with the enriching recycle gas exit at the top through conduit 10 which carries them to the compressor 12. Knock-out drum 6 serves the conventional protective purpose of separating any slugs of liquid from the charge before they reach the compressor where they might result in damage.

The make-up and flow rates of this recirculated gas, the feed and the resulting compressor charge gas are set forth in the table in terms of mols per hour and other rates. The remaining columns of the table are concerned with the overhead and bottoms streams from the two separators described hereinafter.

| Stream | Feed gas | Recycle gas | Comp. charge gas | 1st sep. gas | 1st sep. liquid | $H_2$ prod. | 2nd sep. liquid |
|---|---|---|---|---|---|---|---|
| Lbs./hr | 5,810 | 1,505 | 7,315 | 5,699 | 1,616 | 2,689 | 3,010 |
| Cf./min.[1] | 302.9 | 23.3 | 326.2 | 74.0 | | 50.0 | |
| Mols/hr.: | | | | | | | |
| $H_2$ | 330.4 | 0.9 | 331.3 | 330.5 | 0.8 | 328.8 | 1.7 |
| $C_1$ | 63.4 | 2.9 | 66.3 | 65.3 | 1.0 | 59.4 | 5.9 |
| $C_2$ | 43.5 | 12.7 | 56.2 | 52.8 | 3.4 | 27.4 | 25.4 |
| $C_3$ | 24.5 | 13.0 | 37.5 | 31.1 | 6.4 | 5.0 | 26.1 |
| $i-C_4$ | 7.3 | 3.4 | 10.7 | 7.3 | 3.4 | 0.5 | 6.8 |
| $n-C_4$ | 6.2 | 2.6 | 8.8 | 5.4 | 3.4 | 0.3 | 5.1 |
| $i-C_5$ | 4.3 | 1.1 | 5.4 | 2.2 | 3.2 | | 2.2 |
| $n-C_5$ | 2.3 | 0.5 | 2.8 | 1.0 | 1.8 | | 1.0 |
| Benzene | 0.8 | 0.1 | 0.9 | 0.2 | 0.7 | | 0.2 |
| Other $C_6$ | 3.5 | 0.3 | 3.8 | 0.6 | 3.2 | | 0.6 |
| Toluene | 0.7 | | 0.7 | | 0.7 | | |
| Other $C_7$ | 0.4 | | 0.4 | | 0.4 | | |
| Xylenes | 0.3 | | 0.3 | | 0.3 | | |
| Total | 487.6 | 37.5 | 525.1 | 496.4 | 28.7 | 421.4 | 75.0 |

[1] Cubic feet under flowing conditions per minute.

After the mixture is compressed, it is passed via pipe 14 through the water-cooled cooler 16 and conduit 18 so that the mixture is delivered to the first or atmospheric temperature separator 20 at a gage pressure of 620 pounds per square inch (hereinafter abbreviated as p.s.i.g.) and a temperature of 75° F.

A partial condensation is effected by the combination of compressing and cooling the blend of gases wherein almost all of the aromatic content thereof condenses and is separated in the vessel 20 along with a major molar proportion of each of the other normally liquid hydrocarbons. This liquid is withdrawn through the conduit 22 for the recovery of its aromatic content or blending with gasoline, etc. It is important to separate all appreciable amounts of aromatic compounds from the uncondensed gaseous blend passing overhead in line 24 in order to avoid freezing benzene or xylenes when chilled to low temperatures during later stages in the process with resultant clogging of the equipment. Of course, very small quantities, for example, a few hundred parts per million of such readily freezable aromatic compounds may be tolerated since they will be dispersed throughout a sufficient amount of other liquid hydrocarbons to prevent their solidification in the chilled equipment.

The overhead gas from the first separator is now subjected to indirect, autogenous refrigeration to reduce its temperature to −50° F. in preparation for the second separator that is designed to remove all except traces of the liquid impurities. The gas flowing in pipe 24 passes through automatic 3-way valve 26 and about half of it continues on through line 28 to the indirect heat exchanger 30 where its temperature is reduced to −10° by the time it leaves in line 32 on its way to another exchanger arranged in series. The balance of the gas flowing through line 24 is diverted by valve 26 through a pipe 34 to the indirect heat exchanger 36 which operates in parallel with exchanger 30. The manner of controlling the 3-way valve 26 is described hereinafter. A similar temperature reduction is accomplished in exchanger 36 and the pipe 38 is employed to bring the cooled hydrocarbon stream back at −10° F. to rejoin the other stream in line 32. The resulting single stream is further cooled in the indirect heat exchanger 40 and then carried in pipe 42 to the separator 44 where it separates into liquid and gaseous phases at a temperature of −50° F. under a pressure of 610 p.s.i.g.

After passing upward through the demisting pad 46 of glass wool that prevents any carry over of the liquid phase, the purified and enriched hydrogen-containing gas is drawn off through the overhead conduit 48 to cool the indirect heat exchanger 36. This refrigerant is in turn heated from −50° F. to +56° F. while cooling another portion of the compressed gaseous blend from separator 20, and is then withdrawn through pipe 50. The stream in line 50 is the product of the process and is desirably maintained by pressure controller 51 at a suitably elevated pressure for use in hydrogenating benzene to high purity cyclohexane, such as about 600 p.s.i.g.

The liquid phase is withdrawn from the separator 44 via conduit 52 under the control of the liquid level controller 54 and temperature controller 56 which maintain the desired conditions in this separator as described hereinafter.

The flow rates and composition of the hydrogen product going overhead and the bottoms liquid from the second separator 44 are set out in the last two columns of the table. Upon comparison of the hydrogen product with the raw feed gas, it is apparent that the undesired impurities in the form of normally liquid hydrocarbons have for all practical purposes been completely removed. Also, with a volumetric hydrogen content of 78%, the gaseous product is distinctly richer in hydrogen than the fed gas which contained 67.8% of that element. This purification and enrichment is accomplished by the removal from the system either intermittently or continuously (and preferably the latter) of the aromatic condensate via line 22 from the bottom of the first separator 20 and also about half of the liquid phase accumulating in the second separator 44 as described later.

The bottoms from the second separator is allowed to expand through expansion valve 57 of flow controller 58 which is reset or controlled by a temperature controller 56 to maintain the desired —50° in separator 44. In expanding from a pressure of 610 p.s.i.g. in separator 44 down to 15 p.s.i.g. in line 60 and the final heat exchanger 40, the minimum temperature on the cold side of the heat exchange tubes reaches —83° F. From exchanger 40, the autogenous refrigerant passes to the initial heat exchanger 30 at a temperature of —22° F. through the line 62. A valved by-pass 64 around the exchanger 40 is provided to enable one to vary the flow of refrigerant and consequently the refrigeration duty in this exchanger at will.

In subjecting the overhead effluent from the first separator 20 to its primary chilling in exchanger 30, all of the refrigerant entering from line 62 is completely vaporized by a temperature control technique to be described hereinafter. This vaporized material is carried away in pipe 66 at a temperature of 65° F. to the conventional knockout drum 68 for the recycle compressor. Any liquid separated in this drum is removed via the valved line 70 as necessary, and the overhead leaves in conduit 72 with half of this vapor phase material being withdrawn from the process through conduit 74 under the regulation of a pressure controller 76 which maintains a pressure of 10 p.s.i.g. on the drum.

The other half of the vaporized material, which was drawn off as a liquid from separator 44, passes in line 72 to the two-stage recycle gas compressor 78. Operation of the compressor is regulated by the pressure controller 80 which is set to maintain a pressure of 155 p.s.i.g. in the outlet line 82 from the compressor. The compressed recycle gas is cooled in cooler 84 to a temperature of 95° F. and then enters the conduit 4 where its flow is governed by the flow controller 86 enroute to joining the feed gas in line 2.

In controlling the operation of this purification system, adjustments in operating conditions should be made upon occasion, for instance when there has been a change in the refrigeration load. Alterations in that load can occur as a result of a change in the composition of the feed gas or in its rate of flow or perhaps in the temperature of the water to the cooler 16 for the main compressor.

To illustrate the overall regulation of the plant by instruments, it has already been pointed out that the temperature controller 56 maintains a steady predetermined temperature in second separator 44 by regulating the flow controller 58. If the temperature in separator 44 tends to increase, the flow controller 58 opens to permit a greater flow of vaporizable liquid from the bottom of the vessel. This increased refrigeration capacity chills the heat exchangers 30 and 40 to lower temperatures and results in more of the compressed gaseous material being liquefied in those exchangers, provided that this gaseous material has a sufficient content of readily condensable hydrocarbons to allow more of it to liquefy. The increase in liquefaction must correspond with the increased flow of bottoms liquid from separator 44. When, under these conditions, there is an insufficient increase in the rate of condensation, the liquid level in separator 44 tends to fall and this brings the liquid level controller 54 into action to open the recycle flow controller 86 more in response to the demands to the level controller. Such increased recycle of the rich gaseous mixture with its relatively high proportion of readily condensable components enriches the capacity of the entire circulating gas stream for the necessary increase in antogenous refrigeration. This results in the condensation of liquid at a greater rate in the second separator 44 and thereby readjusts the level of the liquid therein to a suitable level. When the flow controller 86 calls for an increased flow therethrough, the recycle compressor 78 is automatically regulated accordingly by pressure controller 80 to maintain a constant discharge pressure, consequently gas for fuel is withdrawn through pipe 74 at a slower rate as the pressure controller 76 closes down to maintain the usual pressure on vessel 68. If the temperature in separator 44 tends to drop, the controls operate in an opposite manner to accomplish the opposite result.

It is also contemplated that the system may be operated manually in a similar fashion but automatic control is greatly preferred.

The entire liquid fraction drawn from the bottom of the second separator 44 should be vaporized in the internal refrigeration cycle for maximum economy. From a standpoint of minimum power consumption in the main compressor 12, it is important to utilize the very considerable refrigerative capacity in the latent heat of vaporization of this liquid material, since its latent heat is greater than its sensible heat and also easier to employ for refrigeration processes. In addition, there is no reason for desiring to have any significant proportion of liquid in the material flowing from line 66 into knock-out drum 68 as that would merely require increasing the size of the drum without any corresponding benefit.

Complete vaporization of the liquid bottoms fraction from the second separator by the time it leaves heat exchanger 30 may be readily accomplished by attaching a temperature controller 88 to transfer line 66 and setting said controller to maintain the temperature in that pipe high enough to insure that no significant quantity of liquid is present in line 66 under the prevailing pressure. The controller 88 operates to regulate the position of the automatic 3-way valve 26 so that more of the compressed gas in line 24 passes through pipe 28 and the heat exchanger 30 whenever the temperature in line 66 tends to drop below the selected figure and vice-versa. The balance of the gas to be refrigerated passes through the heat exchanger 36 where it is chilled by the gaseous phase withdrawn from the cold separator 44. As a result of this, the cold gaseous product from conduit 48 is heated up from —50° F. to or near the atmospheric temperature for processing use without expenditure of fuel.

Besides the purified product leaving in line 50, two other streams are being withdrawn at least intermittently from the process. One of these is the aromatic-rich liquid from the bottom of the first separator 20 with a substantial content of normally gaseous and normally liquid aliphatic hydrocarbons. The other is gaseous fraction taken off as fuel in pipe 74, which usually constitutes about half of the bottoms liquid from the second separator 44 and contains a major molar proportion of normally gaseous hydrocarbons in addition to the remainder of the normally liquid hydrocarbons which were charged to the purification system and not condensed in the first separator. These two by-product streams also have an insignificant hydrogen content; therefore, their removal from the process enriches the hydrogen content of the purified product by removing substantial amounts of hydrocarbons with no appreciable loss of hydrogen. This is another advantage of the present invention over purification by absorption inasmuch as the enriching effects of the absorption methods would be insignificant because there would be no comparable removal of the normally gaseous hydrocarbons; whereas very little $C_{3+}$ material is retained in the present product and the still lighter hydrocarbons are distinctly reduced in quantity.

In starting up the system described herein, there is initially no refrigerant liquid available in the bottom of separator 44, hence no gaseous mixture rich in readily condensable materials is then available for recycling to enrich the feed gas. Accordingly, in commencing operations, the bottoms liquid from the first separator 20 operating at about atmospheric temperature is passed through the valved line 90 to make up this deficiency, and this less volatile liquid serves as both the refrigerating medium and the enriching material until the system begins to condense other readily condensable constituents at a rate sufficient to permit the throttling and eventual stopping of the flow of the auxiliary liquid through line 90.

The instant process requires enriching the lean gaseous charge sufficiently for the liquefaction of a substantial proportion of the readily condensable substances therein, and for optimum efficiency at least about 40 mol percent of the content of readily condensable material is so liquefied. This is accomplished by blending into the lean feed a rich gaseous mixture which desirably has a content of readily condensable material of at least about 40%, and preferably more than 50% of the total mols in the rich mixture. At the time of liquefaction under refrigeration, the gaseous blend should contain at least 16 mol percent of normally gaseous, readily condensable mixture.

In a preferred embodiment of the purification process, the lean gaseous feed contains at least about 40 mol percent of hydrogen and less than about 17 mol percent of normally gaseous, readily condensable hydrocarbons, and refrigeration is regulated to condense substantially all of the normally liquid hydrocarbons and preferably to produce a temperature low enough to condense a major proportion of each $C_{3+}$ hydrocarbon.

In the case of hydrogen-hydrocarbon mixtures undergoing purification, it is particularly desirable to include a substantial proportion, and desirably a major molar proportion, or normally gaseous, readily condensable hydrocarbons in the recycle stream. These $C_{2-4}$ hydrocarbons constitute excellent refrigerants and the hydrogen product is enriched by their removal from the product stream.

Enriching the lean charge mixture with a part of the material from the liquid phase of the final separator is a peculiar but effective way of purifying the charge because the stream employed for the enrichment is very low in the desired difficulty condensable substance (e.g., hydrogen) and has a content of undesired normally liquid material (e.g., $C_{5+}$ hydrocarbons) about double that of the raw feed and a major proportion of diluents (e.g., $C_{1-4}$ hydrocarbons). Thus diluents and undesirable impurities constitute almost all of the gaseous material utilized in purifying and enriching the raw material, yet this unique additive facilitates the condensation of a sufficiently greater proportion of the charge to effect a clear separation of substantially all normally liquid materials and most of the readily condensable, gaseous materials from the purified lean product.

In the improved automatic control of liquefaction operations of this type, it will be observed that the flow of liquid fraction used for indirect cooling is varied directly in response to changes in the temperature during the separation of the gaseous and liquid phases and that the rate of recycling the vaporized liquid fraction to the blending operation is varied directly in response to changes in the rate of accumulating said liquid fraction.

As for the gaseous purified product stream, its pressure may be reduced below that maintained in the second separator if it is desired to utilize the maximum refrigeration capacity of this stream, but nothing is to be gained by letting its pressure drop below that commonly employed in the further processing in which this product will be utilized. For must purposes, this purified product is desirably warmed as by serving as the refrigerant in heat exchanger 36 to approximately ambient temperature.

While a specific preferred embodiment of the present invention has been described in detail herein and the invention has especial utility in the purification of hydrogen-hydrocarbons mixtures, it will be readily appreciated by those skilled in the art that the invention is not limited to this particular manifestation as pointed out earlier. Accordingly, the present invention should not be construed as limited in any other manner except the recitations of the appended claims or may be required by the prior art.

What is claimed is:

1. A continuous process for the purification of a lean gaseous mixture to improve its suitability as a source of hydrogen which comprises blending said lean gaseous mixture containing at least about 40 mol percent of hydrogen and less than about 17 mol percent of normally gaseous, readily condensable hydrocarbons with a sufficient amount of a rich gaseous mixture containing a major molar proportion of normally gaseous, readily condensable hydrocarbons to provide a content of at least about 16 mol percent of normally gaseous, readily condensable hydrocarbons in said blend after subsequent removal of aromatic hydrocarbons therefrom by partial condensation, compressing said blend to an elevated pressure, cooling said compressed blend sufficiently to condense substantially all aromatic hydrocarbons therein, removing the aromatic condensate from said process, liquefying a substantial part of the uncondensed blend by autogenous refrigeration sufficient to condense a major proportion of each hydrocarbon therein containing at least 3 carbon atoms, separating the resulting liquid and gaseous fractions thereof, withdrawing said gaseous fraction as the purified product of the process, indirectly chilling said uncondensed blend with said liquid fraction whereby said liquid fraction is vaporized while said uncondensed blend undergoes said liquefaction, and recycling a substantial portion of said vaporized fraction to said blending operation as said rich gaseous mixture.

2. A process according to claim 1 in which another substantial portion of said vaporized fraction containing a major molar proportion of normally gaseous hydrocarbons and a substantially lower proportion of hydrogen than said lean gaseous mixture is continuously withdrawn from said process thereby increasing the proportion of hydrogen in the purified product over that in said lean mixture.

3. A process for the purification of a lean gaseous mixture of hydrogen and hydrocarbons to improve its suitability as a source of hydrogen which comprises enriching said lean gaseous mixture containing at least about 40 mol percent of hydrogen and an insufficient proportion of normally gaseous, readily condensable hydrocarbons for the substantial liquefaction of said hydrocarbons by autogenous refrigeration by blending therewith an amount of a rich gaseous mixture containing a major molar proportion of normally gaseous, readily condensable hydrocarbons sufficient to provide a gaseous blend capable of said liquefaction, liquefying a substantial part of the gaseous blend while containing at least about 16 mol percent of normally gaseous, readily condensable hydrocarbons by autogenous refrigeration sufficient to condense a major proportion of each hydrocarbon containing at least three carbon atoms, separating the resulting liquid and gaseous fraction thereof, withdrawing said gaseous fraction as the purified product of the process, indirectly chilling said gaseous blend with said liquid fraction whereby said liquid fraction is vaporized while said gaseous blend undergoes said liquefaction, and recycling a substantial portion of said vaporized fraction to said enriching operation as said rich gaseous mixture.

4. A process according to claim 3 which includes the steps prior to said liquefaction by autogenous refrigeration of compressing said gaseous blend to a substantially elevated pressure, cooling said compressed blend and removing from said cooled blend and from said process any material subject to freezing during said autogenous refrigeration.

5. A continuous process for the purification of hydrogen in a lean gaseous mixture containing at least about 40 mol percent of hydrogen and an insufficient proportion of normally gaseous, readily condensable hydrocarbons for the substantial liquefaction of said hydrocarbons by autogenous refrigeration which comprises blending said lean gaseous mixture with a rich gaseous mixture containing at least 40 mol percent of said hydrocarbons in a blending ratio sufficient to permit the liquefaction of at least about 40 mol percent of the normally gaseous, readily condensable hydrocarbons in the resulting blend when subjected to autogenous refrigeration, liquefying at least about 40 mol percent of the normally gaseous, readily condensable hydrocarbons in said gaseous blend by indirect autogenous refrigeration, separating the resulting liquid and gaseous fractions thereof, withdrawing said gaseous fraction as the purified product of the process, indirectly chilling said gaseous blend with said liquid fraction whereby said liquid fraction is vaporized while said gaseous blend undergoes said liquefaction and recycling a substantial portion of said vaporized fraction to said blending operation as said rich gaseous mixture.

6. A process according to claim 5 in which another substantial portion of said vaporized fraction containing a major molar proportion of normally gaseous hydrocarbons and a substantially lower proportion of hydrogen than said lean gaseous mixture is continuously withdrawn from said process thereby increasing the proportion of hydrogen in the purified product over that in said lean mixture.

7. A process according to claim 5 in which said gaseous blend is compressed to an elevated pressure, said compressed blend is cooled sufficiently to condense substantially all aromatic hydrocarbons therein and the aromatic hydrocarbon condensate is removed from said process prior to said liquefaction by autogenous refrigeration.

References Cited by the Examiner

UNITED STATES PATENTS

| | | | |
|---|---|---|---|
| 1,804,432 | 5/1931 | Pollitzer | 62—23 X |
| 1,913,628 | 6/1933 | Falkenberg | 62—24 |
| 1,913,805 | 6/1933 | Hausen. | |
| 2,274,094 | 2/1942 | Rupp | 62—27 |
| 2,500,129 | 3/1950 | Laverty | 62—26 X |
| 2,557,171 | 6/1951 | Bodle. | |
| 2,599,133 | 6/1952 | Schilling | 62—21 |
| 2,973,834 | 3/1961 | Cicalese. | |
| 3,119,677 | 1/1964 | Moon | 62—23 |
| 3,126,266 | 3/1964 | Meisler. | |

NORMAN YUDKOFF, *Primary Examiner.*